March 28, 1939.   E. K. CLARK   2,151,744
THERMOSTAT
Filed Dec. 13, 1935
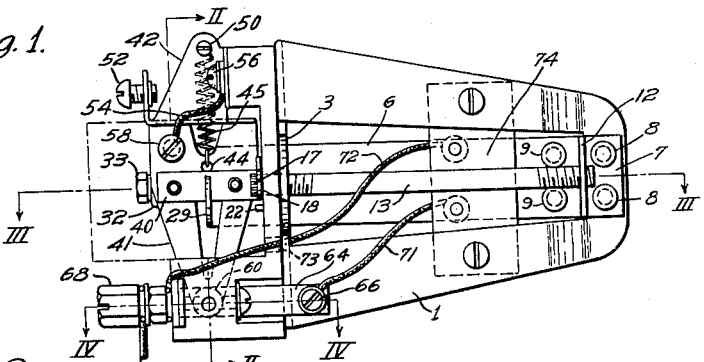
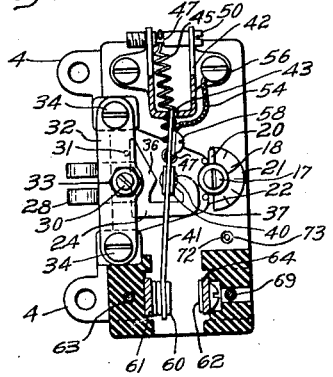
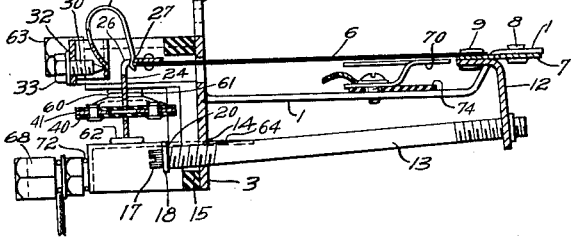
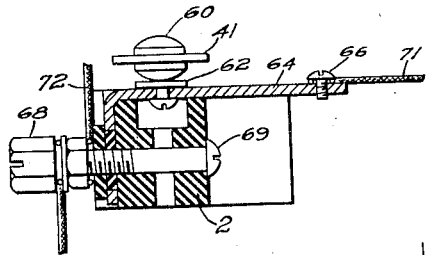
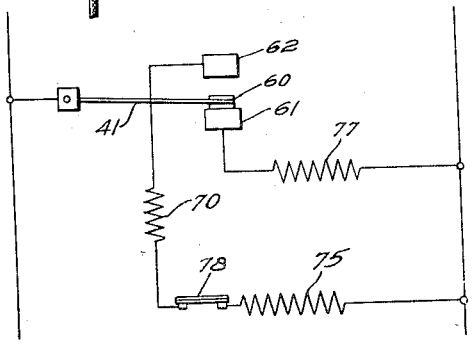
WITNESSES:
INVENTOR
Earl K. Clark.
BY
ATTORNEY Patented Mar. 28, 1939

2,151,744

UNITED STATES PATENT OFFICE 2,151,744

THERMOSTAT

Earl K. Clark, Mansfield, Ohio, assignor to Westinghouse Electric & Manufacturing Company, East Pittsburgh, Pa., a corporation of Pennsylvania Application December 13, 1935, Serial No. 54,253

12 Claims. (Cl. 200—139)

This invention relates to thermostats and more particularly to thermostats intended for use with a water heater.

An object of this invention is to make a thermostat more quickly and positive in action and responding to a smaller temperature differential.

Another object of this invention is to provide an effective and ready adjustment for the contact device which will vary the pressure between the movable contact and the stationary contacts.

Another object of this invention is to provide a means for adjusting the initial position of the bimetallic member and thereby controlling the temperature at which the thermostat will operate. Particularly, this object includes providing a means for moving the bimetallic member through very small angles.

Other objects of the invention and details of the structure will be apparent from the following description and the accompanying drawing, in which—

Figure 1 is a plan view of the device looking at the face opposite the bimetallic member, Fig. 2 is a section taken on the line II—II of Fig. 1, Fig. 3 is a section taken on the line III—III of Fig. 1, Fig. 4 is a section taken on the line IV—IV of Fig. 1 on an enlarged scale, and Fig. 5 is a circuit diagram.

The device includes a frame 1 upon which is mounted a molded member of insulation 2, the metallic frame 1 and the insulation member 2 being secured together at an upstanding ear 3 and near two downwardly extending ears 4. The ears 4 afford means for mounting the device in a housing, not shown. The bimetallic member 6 is mounted upon the frame 1 by means of a leaf spring 7 which is secured to the frame 1 by rivets 8 and to the bimetallic member 6 by rivets 9. The rivets 9 also secure the spring 7 and the bimetallic member 6 to a bracket 12 which is thus rigid with the bimetallic member 6.

Through the upper end of the bracket 12 as seen in Fig. 1, which is the lower end, as seen in Fig. 3, there extends a screw threaded rod 13 which is threaded into the bracket 12. The hole which has been punched in the bracket 12 for this purpose is threaded to cooperate with the threads upon the screw. The other end of the rod 13 extends through a hole 14 in the ear 3 and through the insulation at 15. The hole 14 is threaded and the threads on the rod 13 cooperate therewith. The threads at the two ends of the rod 13 are unlike in sense, so that rotation of the rod will move it in the ear 3 and move the bracket 12 relative to the rod 13 in the same direction, thus giving more movement of the bracket for the same degree of rotation than would a single thread. Provision for the rotation of the rod is made by providing a slotted head 17, upon the base of which is mounted a collar 18 having a pointer 20 which cooperates with a scale 21 engraved, moulded or otherwise provided on the insulation 2. The insulation is provided with two upstanding stops 22 for limiting the movement of the collar 18 and so of the rod 13.

The end of the bimetal 6 remote from the spring 7 is provided with a bracket 24 which is riveted to the end of the bimetallic member and has a right angle bend so that the main portion of the bracket extends toward the rod 13. This main portion is best seen in Fig. 2. Between the main portion of the portion which is riveted to the bimetallic member 6, a hole is provided, as shown at 26 in Fig. 3, for the reception of one end of a C-shaped spring 28. The end of the spring 28 which enters the hole 26 has a V-shape as shown at 27 which cooperates with the end of the bimetallic member 6. The other end of the spring is dented to cooperate with the point of a screw 30 which is threaded into a bracket 32, mounted upon the insulation by means of two screws 34. A lock nut 33 is provided for securing the screw 30 against movement in the bracket.

The spring 28 exerts a pressure between the point of the screw 30 and the end of the bimetallic member 6. The thrust of the spring is directed along the bimetallic member but not exactly in line therewith. The line from the point of the screw 30 to the center of the notch 27 will not pass through the spring 7, except in one position of the bimetallic member 6. This position constitutes the dead center and the spring 28 will move the bimetallic member to one or the other limit of its motion as this line passes above or below the spring 7.

The bracket 24 contains a notch which has two abutment points 36 and 37. One or the other of these points contacts with the bridge member 40 which is riveted across a movable contact carrier 41. The carrier 41 is pivotally mounted in a bracket 42, as shown at 43. It has a hole 44 into which a spring 45 is hooked. The other end of the spring 45 is hooked into a groove 47 in a screw 50 which is mounted in the walls of the bracket 42 being threaded in one wall and rotatably and slidably mounted in the other. The bracket 42 also supports a tongue carrying a screw 52 which serves for the connection of a wire.

To afford a better current carrying action between the bracket and the carrier 41 of the movable contacts, a flexible connection, shown at 54, is used. It is connected to a screw 56, which serves to secure the bracket 42 on the insulation and to the movable contact carrier 41 as shown at 58. The distal end of the movable contact carrier 41 carries a two faced contact, shown at 60 which cooperates with a stationary contact 61 in one position and a stationary contact 62 in the other.

The contact 61 includes a metallic right angled member extending around the corner of the insulation and connected to a binding post 63. The contact 62 is united with a strap 64, Fig. 4, which extends through a slot in the insulation beyond that face of the insulation toward the frame 1. In this strap is mounted a screw 66 by means of which a connection may be made to the strap. On the opposite face of the insulation adjacent the same contact 62, a binding post 68 is located mounted by means of a screw 69 which is insulated from the contact 62.

A heater 70 is mounted upon the shelf 74, preferably of mica, and is in close proximity to the bimetallic member 6. One terminal of this heater is connected by the conductor 71 to the binding post 66 and the other terminal is connected by the conductor 72 to the binding post 68. The conductor 72 extends through a hole 73 in the insulation.

In the use of this device it is mounted within a housing (not shown) and immersed in a tank of liquid to be heated, also not shown. The binding post 68 connects the contact 62 to a heating coil 75, Fig. 5, preferably located near the bottom of the tank of liquid to be heated and binding post 63 connects the contact 61 to a heater coil 77 which is preferably located near the top of the tank of liquid. A second thermostat 78, a single contact one, located near the bottom of the tank, controls the heating coil 75.

In the operation of the device, the screw 13 is adjusted by means of the slotted head 17 until the distance that the bimetal must bend in order to pass the dead center is such that the passage will occur at the desired temperature.

The bracket 12 being moved, bends the spring 7 which causes the bimetallic member 6 to assume the new configuration, in which it is bowed more or less than before according to the direction of the rotation of rod 13.

As the thermostatic member 6 is heated, it bows more and more, straining against the action of spring 28, until its force is sufficient to overcome that of said spring. This will occur when the end of the bimetallic member 6, if that member were not restrained by the spring 28 and consequently would not be bowed, would under the new temperature be just beyond the dead center position of the spring end 27. Then the bimetallic member 6 moves abruptly, passing the mid position and thereby reversing the action of the spring 28, so that it now tends to hold the member 6 in the opposite position. During this movement, the member 24 moved and the abutment point 37 which was in contact with the bridge member 40 left it, and the abutment point 36 came into contact with the bridge and moved it and the contact carrying member 41 toward the opposite position.

This movement is partly in response to the energy stored in the member 6 and partly to energy in the spring 28. There is room enough between the points 36 and 37 for the bracket 24 to acquire sufficient velocity before the newly contacting point reaches the bridge 40 to ensure that the opening of one circuit and the closing of the other will be abrupt.

As the member 41 passes its dead-center position, the direction of resultant action of spring 45 upon the member 41 will be reversed and during the remainder of the movement, the spring 45 assists it. The position of the dead center and the degree of pressure between the contacts is adjusted by adjusting the angle between the axis of the spring 45 and the line from the pivot 43 of the member 41 to the hole 44 where the spring is attached.

When the thermostat is cooled, the strain in member 6 is in the opposite direction and the spring 28 is again strained until it passes the dead center. The abrupt movements then take place in the opposite direction. In this direction also they are as abrupt as in the first.

When the screw 13 is rotated, the bracket 12 is moved through an angle which is determined by the sum of the pitches of the threads at the two ends of the screw. The movement of the bracket 12 flexes the spring 7 and adds to or subtracts from the degree to which the bimetallic member 6 is arched. The configuration of the bimetallic member is thus determined by the setting of the member 13, which can be determined from the scale 21. It will be nearer or farther from the dead center relation to the spring 28 according as the motion of the member 13 is in one direction or the other.

When the thermostat is heated, the arching of the bimetallic member 6 is increased or diminished without perceptible movement of the end of the member. When this action suffices to make the pressure of the bimetallic member against the notch 27 greater than opposing pressure caused by the stress in spring 28, the notch 27 of the spring 28 moves apruptly, as above described.

The excess of pressure of bimetallic member 6 over the spring stress must be sufficient to overcome friction.

Adjustment of the screw 50 changes the angle between the axis of the spring 45 and the length of the member 41. This angle determines the component of the force of the spring 45 which will exert a pressure between the contact 60 and the stationary contact member 61 or 62.

It is intended that this adjustment be made at the factory and not disturbed thereafter. The pressure of contact 60 against the stationary contact should be great enough to ensure no arcing will take place before the snap movement begins and should not exceed this any more than cannot be avoided because such excess adds to the temperature differential of the thermostat.

When the pressure by the bimetallic member 6 against the notch 27 just equals the force exerted by the spring 28, the pressure abutment 37 against bridge member 40 is nil and if no other force acted upon the contact carrying member 41 the pressure of contact 60 against stationary contact 61 would, if not nil, be too small to prevent sparking or sputtering there. The action of spring 45 makes the pressure between the contacts ample.

If there should be any creeping action of the end of the bimetallic member which is in the notch 27 of the spring 28, such creeping will be without effect upon the position of contact 60 because the lost motion between bracket 24 and the bridge 40 will be more than sufficient to care for it. The lost motion is great enough to allow for the movement of the bracket 24 while it is acquiring the needed velocity, which is much more than is needed to provide for the creeping.

Fig. 5 shows a circuit in which the thermostat described may be used. Details of the structure other than the thermostat are not illustrated because the invention does not reside therein. The usefulness of the thermostat is best explained by describing the action beginning with a tank full of cold water. When the power is connected, it heats the upper coil 77 and when the top of the tank is hot, contact 60 moves against contact 62, shutting out coil 27 and connecting coil 75 into circuit. This coil being near the bottom of the tank sets up connection currents and mixes the hot water at the top with the rest of the water. This cools the upper thermostat and so returns contact 60 into touch with contact 61. Coil 75 is now deenergized and 77 energizes again and more water is heated by it until contact 60 again moves against 62. This action is repeated until the water at the bottom of the tank is hot enough to operate thermostat 78. Then the tank is full of hot water and coil 75 is separated from power by the opening at thermostat 78. If a radiant heater 70 is used, it has the effect of heating the upper thermostat faster than the water above could do, thus causing it to work at a lower water temperature and so lengthening the periods of heating by coil 75.

Various modifications may be made in the construction shown and described, and it is desired that only such limitations shall be placed upon the invention as are disclosed by the prior art and set forth in the appended claims.

I claim as my invention:

1. In a thermostat, a frame, a bimetallic member, a spring mounting said bimetallic member on said frame, a bracket rigidly connected to said spring, spring means cooperating with said bimetallic member to establish a dead center, adjusting means for flexing said mounting spring to vary the distance of said bimetallic member from said dead center, said adjusting means including a differential screw one thread thereof working in said frame and the other in said bracket.

2. In a thermostat, a pivoted contact member, two stationary contact members in position to limit the pivotal movement of the pivoted contact member, a spring forming a toggle with said pivoted member, a thermally controlled lost-motion device for actuating said pivoted member against the resistance of said spring after taking up such lost motion and means for changing the line of action of the spring to vary said resistance.

3. In a thermostat, a strip of bimetal secured at one end, a pivotally mounted spring acting lengthwise on said strip and constituting therewith a toggle, a pivotally mounted contact carrying member and a spring acting lengthwise thereof to form with the contact carrying member a second toggle and means connecting the two toggles whereby the resultant of one toggle is additively related to that of the other until the resultant of the toggle including the bimetal strip reverses.

4. In a thermostat, a strip of bimetal secured at one end, a pivotally mounted spring acting lengthwise on said strip and constituting therewith a toggle, a pivotally mounted contact carrying member, contacts carried thereby, and a spring acting lengthwise thereof to form with the contact carrying member a second toggle and means connecting the two toggles whereby the resultant of one toggle is additively related to that of the other until the resultant of the toggle including the bimetal strip reverses, stationary contacts cooperating with the contacts on the contact carrying member, the pressure between cooperating contacts being controlled by the combined resultants of the two toggles.

5. In a thermostat, a frame, a bimetallic element secured thereto and extending in one direction, a contact-carrying member movably mounted on said frame and extending at substantially right angles to said element and in a different plane, a lost-motion connection between said element and said member, and resilient means cooperating with said element to effect snap action thereof and of said member to a new position under predetermined temperature conditions.

6. In a thermostat, a frame, a bimetallic element secured thereto and extending in one direction, a contact-carrying member movably mounted on said frame and extending transversely to said bimetallic element, means rigidly secured to said element and having a lost-motion connection with said member, resilient means cooperating with said element to effect snap action thereof and of said member to a new position under predetermined temperature conditions, and spring means for resiliently maintaining said member in its new position.

7. In a thermostat, a frame, a bimetallic element secured thereto and extending in one direction, a contact-carrying member movably mounted on said frame and extending transversely to said element and in a different plane, means angularly related to said element adapted to actuate said member, resilient means cooperating with said element to effect snap action thereof and of said member to a new position under predetermined temperature conditions, and an over-center spring for resiliently maintaining said member in its new position.

8. In a thermostat, a frame, a bimetallic element secured thereto and extending in one direction, a contact-carrying member movably mounted on said frame and extending at substantially right angles to said element and in a different plane, a lost-motion connection between said element and said member, resilient means cooperating with said element to effect snap action thereof and of said member to a new position under predetermined temperature conditions, and an over-center spring for resiliently maintaining said member in its new position.

9. In a thermostat, a frame, a bimetallic member mounted thereon, spring means cooperating with one end of said bimetallic member to form a toggle, a bracket secured to the other end of said bimetallic member, and adjusting means for the latter operating between said bracket and said frame.

10. In a thermostat, a frame, a bimetallic member mounted thereon, spring means interposed between said frame and one end of said bimetallic member, a bracket secured to the other end of said bimetallic member, and adjusting means for the latter operating between said bracket and said frame.

11. In a thermostat, a frame, a bimetallic member mounted thereon, spring means of substantially U-shape having the ends of its respective arms interposed between said frame and one end of said bimetallic member, a bracket secured to the other end of said bimetallic member, and adjusting means for the latter operating between said bracket and said frame.

12. In a thermostat, a frame, a bimetallic member, a spring mounting said bimetallic member on said frame, a bracket secured to one end of said bimetallic member, spring means cooperating with the other end of said bimetallic member to establish a dead center, and an adjusting screw operating between said frame and said bracket for flexing said mounting spring to vary the distance of said bimetallic member from said dead center.

EARL K. CLARK.